H. F. FRANKLIN.
CINEMATOGRAPHIC TARGET.
APPLICATION FILED JULY 27, 1916.

1,328,275.

Patented Jan. 20, 1920.
2 SHEETS—SHEET 1.

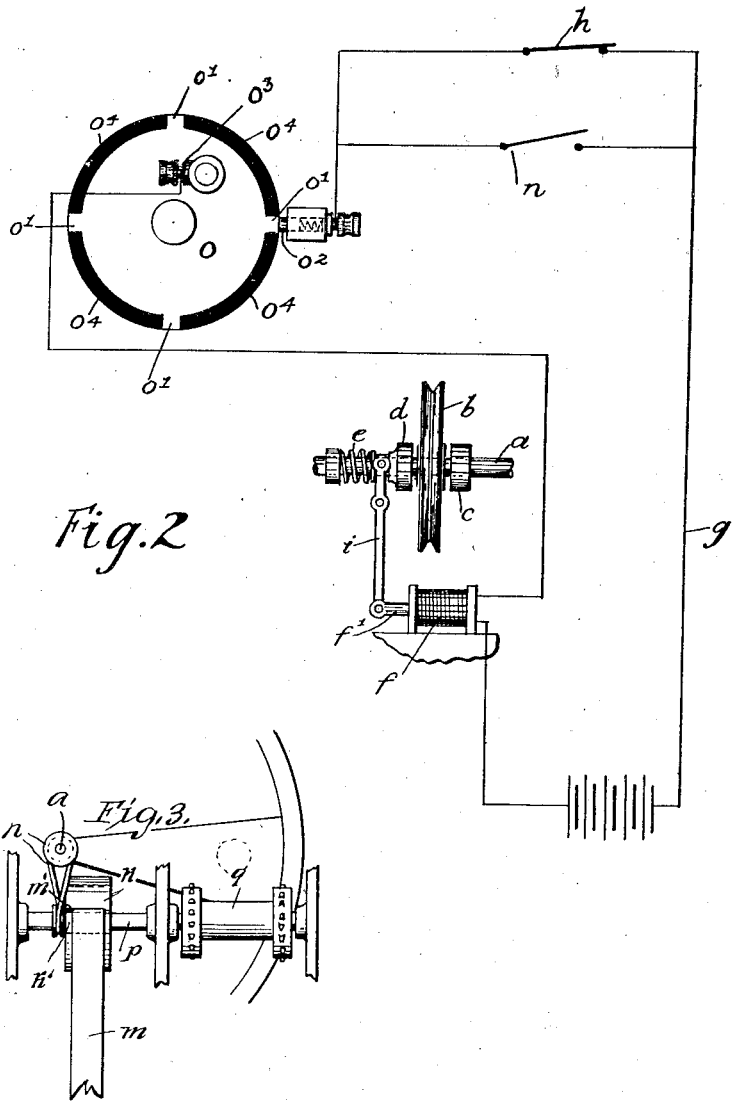

UNITED STATES PATENT OFFICE.

HUBERT F. FRANKLIN, OF BROOKLYN, NEW YORK, ASSIGNOR, BY MESNE ASSIGNMENTS, TO ANIMATED TARGET COMPANY, INC., OF NEW YORK, N. Y., A CORPORATION OF NEW YORK.

CINEMATOGRAPHIC TARGET.

1,328,275.     Specification of Letters Patent.     Patented Jan. 20, 1920.

Application filed July 27, 1916. Serial No. 111,557.

*To all whom it may concern:*

Be it known that I, HUBERT F. FRANKLIN, a citizen of the United States, residing at the borough of Brooklyn, city of New York, county of Kings, and State of New York, have invented certain new and useful Improvements in Cinematograph-Targets, of which the following is a specification, reference being had therein to the accompanying drawings, which form a part thereof.

My invention relates to cinematograph targets and more particularly to a controlling mechanism for the projector by means of which the image upon the screen will become stationary substantially simultaneously with the discharge of a firearm.

Heretofore in cinematograph targets, automatically acting means have been provided to cause the stoppage of the projector substantially simultaneously with the discharge of the firearm, or the impact of the bullet with the screen, to cause the moving image to remain stationary for a sufficient interval to permit the marker to determine the accuracy of the marksman. No means have been provided, however, by which the operation of the projector controlling mechanism is so synchronized with the film feeding mechanism of the projector, as to insure the stoppage of the latter with the film in a position where one complete picture of a series will remain at the sight opening of the projector and thus insure the figures of the still image being shown in the same relation on the screen, or substantially the same relation, they occupied when the firearm was discharged. Heretofore, owing to the impossibility of timing the discharge of the firearm with relation to the movements of the film, there has always been likelihood of a portion of two succeeding pictures being exposed at the time of the stoppage of the projector and this has been found in practice to occur with sufficient frequency to impair the efficiency of the apparatus.

By utilizing a projector controlling mechanism made in accordance with my invention, the projector, irrespective of the moment of the actuation of the means for arresting its motion, cannot be stopped until a full picture is positioned before the sight opening of the projector, and will be positively stopped when the next full picture succeeding the actuation of this mechanism, is in this position.

A device made in accordance with my invention may be applied to a type of projector wherein the movement of the shutter is automatically arrested, so as to keep the lens-opening open upon the stoppage of the projector, the device of this application having to do solely with a means for controlling the movement of the film in a manner to secure the projection of one full picture of a series upon the film at the time of the stoppage of the projector.

The invention consists primarily in a cinematograph target embodying therein a controlling mechanism for a projector including therein a switch adapted to be automatically actuated substantially simultaneously with the discharge of a fire arm to control an electric circuit, means whereby the transmission of power to the film feeding mechanism of the projector is controlled; means included in said circuit adapted to actuate said first named means, and automatically acting means whereby the actuation of said switch mechanism is made inoperative as to said first named means except when a full picture is exposed to the sight opening of the projector; and in such other novel features of construction and combination of parts as are hereinafter set forth and described and more particularly pointed out in the claims hereto appended.

Referring to the drawings:—

Fig. 2 is a similar view of a modified form of the invention, and Fig. 3 is a view showing the operative relation of the parts for controlling the switch mechanism, and the sprocket mechanism for feeding the film.

Like letters refer to like parts in both of said views.

Figure 1:
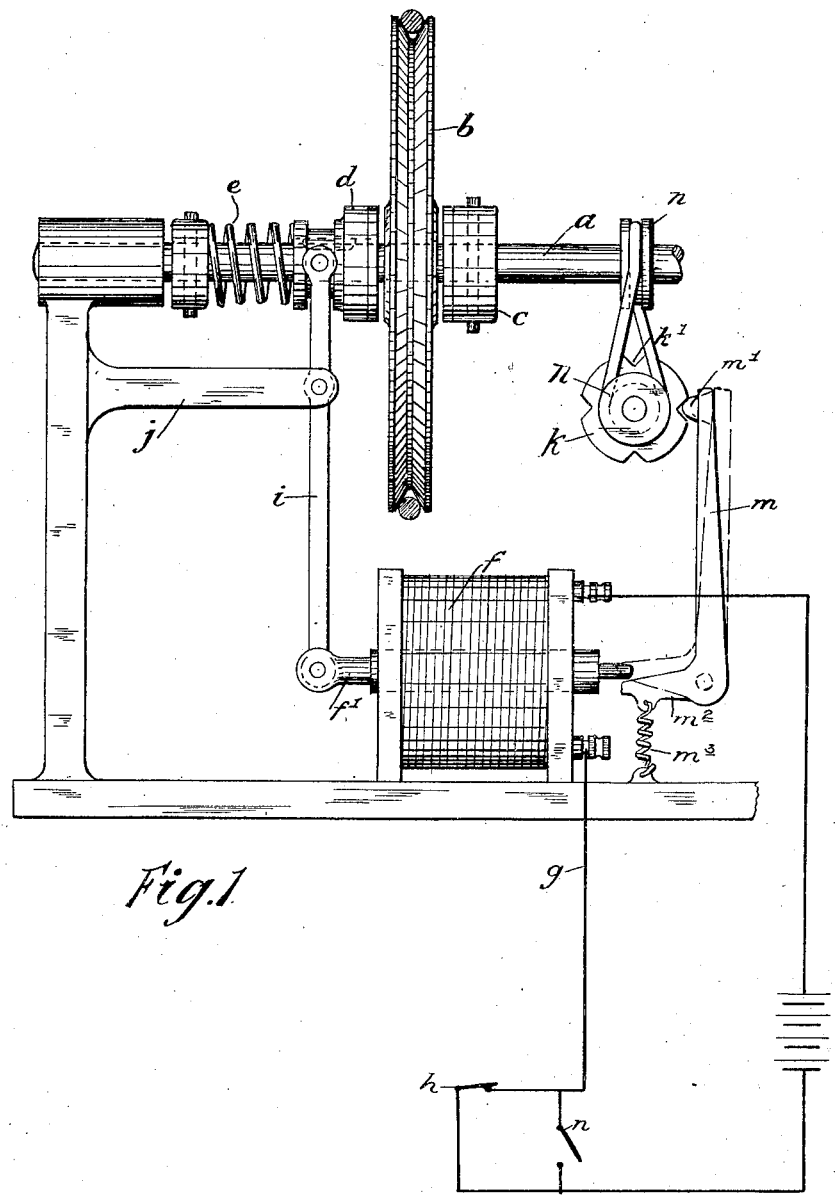
Figure 1 is a diagrammatic view of the controlling means by which the stoppage of the projector is synchronized with the movements of the film.

In the embodiment of my invention shown in the drawings, I have indicated at *a*, the main shaft of a projector, not shown, through which shaft power for feeding the film, is derived. Idly mounted upon said shaft is a pulley *b* mounted between a friction clutch member *c* fixedly mounted upon the shaft $a$ and a second clutch member $d$ slidably mounted upon said shaft. The clutch members $c$—$d$ and the hub of the pulley $b$ are provided with coöperating friction faces. The clutch member $d$ is normally thrust toward the pulley $b$ by the spring $e$ so that under normal conditions, the clutch mechanism connecting the shaft $a$ and the pulley $b$ is so set as to insure a continued lineal traverse of the film. While preferably the pulley $b$ is driven from a motor, the operative effect of the mechanism of this invention would not be modified if the projector were actuated by hand.

A cinematograph target is designed to permit a marksman to practise firing at moving objects; but since the objective of the fire is merely transitory and intangible, it is necessary to hold the image stationary upon the screen at the time of the impact of the bullet with the screen so as to indicate the position of the object, in order to determine the accuracy of the fire. To secure this result it has been necessary to provide automatically acting means to arrest movement of the projector substantially simultaneously with the discharge of the firearm. The means employed varies in different types of targets, some types utilizing the trigger movement of the gun for closing an electric circuit to the projector; another type employing a microphone operative by the report of the gun for controlling this circuit; while still another type depends upon the impact of the bullet with the movable back shield or plate of the target, for controlling this circuit.

My present invention is applicable to any of these types.

In the form of the invention shown in Fig. 1 of the accompanying drawings, the automatically acting means whereby the closing of the circuit to effect the stoppage of the projector is made inoperative as to the film feeding mechanism except when a full picture is exposed is operative entirely independently of said switch, and acts to release the clutch member $d$. Specifically the mechanism includes an electro-magnet $f$ (of the solenoid type) included in an electric circuit $g$. The automatic switch mechanism for opening and closing said circuit is indicated at $h$. The core $f'$ of the solenoid is pivotally connected to a rocking lever $i$ mounted in an arm $j$ of a suitable frame, the other end of said lever being operatively connected with the clutch member $d$ in a manner to occasion the release of said clutch when said magnet $f$ is energized. Mounted upon the shaft $p$ carrying one of the sprockets $q$ for feeding the film is a disk $k$ having a plurality of spaced recesses $k'$, the spacing of these recesses being such as to coincide with the length of succeeding pictures upon the film, the space between these notches being equal to the length of one picture. Coöperating with the disk $k$ is a locking member $m$ having a head $m'$ adapted to enter the several recesses $k'$ and a heel $m^2$ acted upon by the spring $m^3$ in a manner to normally hold the head $m'$ of said locking member in engagement with the said disk $k$. The disk $k$ is rotated by any desired mechanism such as the belt and pulley connection $r$ between the shafts $a$ and $p$.

The heel $m^2$ is so positioned that at all times excepting when the head $m'$ is projected within one of the recesses $k'$, it will be in substantial alinement with the core $f'$ and in such close juxtaposition thereto as to prevent movement of said core in a manner to effect the release of the clutch mechanism, coupling the pulley $b$ to the shaft $a$. By this arrangement, I secure a mechanical stop mechanism which will prevent the actuation of the magnet $f$ excepting when the film feeding mechanism is in a position to expose one full picture of the series upon a film through the sight opening of the projector.

Under some conditions it is desirable to provide manually operative means whereby the projector may be stopped independently of the automatically actuated circuit controlling mechanism $h$ and in the form of the invention shown in Fig. 1 of the drawings, I provide in the circuit $g$ a manually operative switch $n$ by means of which the circuit to the magnet $f$ may be controlled independently of the operations of the said switch $h$.

In the form of the invention shown in Fig. 2 the operative effect is substantially the same as with the form of the invention shown in Fig. 1, this embodiment of my invention differing from that shown in Fig. 1 in the respect that instead of preventing the actuation of the core of the magnet $f$ by means of an oscillatory lever under the control of a notched disk upon the shaft of the intermediate gear of the gear train driving the film feeding mechanism of the projector, I provide in the circuit $g$ a commutator $o$ carried by the shaft of the intermediate gear of the film feeding gear train, the contacts $o'$ of which commutator are spaced apart in substantially the same manner and for the same purpose as the notches $k'$ of the disk $k$. In this manner while the switch $h$ may be actuated to close the circuit to the magnet $f$, the supplemental make and break mechanism afforded by the commutator will not permit the closing of the circuit excepting when a full picture is exposed through the sight opening of the projector. In all other respects, the form of the invention shown in Fig. 2 is identical with the form of the invention shown in Fig. 1.

Coöperating with the commutator $o$ is a brush $o^2$ adapted to engage said contacts, the circuit from said commutator being completed through the brush $o^3$ bearing upon the side of the body of the commutator. The periphery of the commutator between the contacts $o'$ is provided with suitable insulation $o^4$.

The operation of the herein described controlling mechanism, for projectors is substantially as follows:—

Referring particularly to the form of the invention shown in Fig. 1, while the projector is in operation, the clutch coupling the actuating mechanism for said projector to the shaft $a$ will be normally set through the spring $e$, the magnet $f$ being deënergized at this time. As the film feeding mechanism rotates, it will rotate the disk $k$, causing the lever $m$ to be oscillated as it follows the irregularities of the surface of the said disk. As the head $m'$ of said lever rides upon the surface of the disk $k$ between the recesses $k'$ the heel $m^2$ will be raised against the tension of the spring $m^3$ so as to bring the flattened end of said heel $m^2$ in substantial alinement with, and in close juxtaposition to, one end of the core $f'$ of the magnet $f$. When a shot is fired at the target, however, the switch $h$ will be automatically closed thus energizing the magnet $f$ in a manner to cause the actuation of the core $f'$ toward the lever $n$ with a resultant oscillation of the lever $i$ and disengagement of the clutch member $d$ from the pulley $b$. If at the instant of the closing of the circuit by the switch $h$ one picture of a series upon the film is moving across the sight opening so as to expose a part thereof, and a part of the succeeding picture, the head $m'$ of the lever $m$ will be between adjacent recesses or notches $k'$ and the heel $m^2$ will be projected in the path of the core $f'$. Hence, although the magnet will be energized no movement will be imparted to said core and power will be continued to be applied to the shaft $a$. Immediately, however, after the head $m'$ drops into the succeeding recess $k'$ under the control of the spring $m^3$, the core $f'$ will be released, thus permitting its movement in a manner to actuate the releasing mechanism controlling the clutch member $d$. Since at all times when the head $m'$ of the lever $m$ is seated in one of the recesses $k'$ a full picture will be exposed through the sight opening, it is apparent that at such times, the lever $m$ and disk $k$ which are operative entirely independently of the switch mechanism $h$ will permit the actuation of the clutch releasing mechanism, and at all other times will prevent such actuation. Furthermore, when the head $m'$ of the locking lever $m$ enters one of the recesses $k'$ and the core $f'$ has been actuated, it will disengage the clutch connecting the pulley $b$ with the shaft $a'$; and the end of said core will project above the heel $m^2$ in a manner to prevent the head $m'$ leaving the recess in which it is seated, thus avoiding overrunning of the film and insuring stoppage of the projector when the picture exposed will be the one actually shown upon the screen at the time of the discharge of the firearm or the one immediately following it wherein the position of the figure will be substantially the same as in the said first named picture.

If it be desired to stop the screen independently of the automatically acting switch $h$, this may be done by manually closing the switch $n$.

Referring now to the form of the invention shown in Fig. 2, upon the actuation of the switch $h$, if the brush $o^2$ is not in engagement with one of the contacts $o'$, the closing of the circuit will be delayed until the rotation of the commutator $o$ brings one of the contacts $o'$ into engagement with said brush whereupon the circuit to the magnet $f$ will be instantly closed through said contact $o'$, the commutator $o$ and the brush $o^3$ engaging the side of the body of the commutator. Hence the actuation of the magnet $f$ is prevented until the circuit has been closed through said commutator and since at the moment of engagement of any of the contacts $o'$ with the brush $o^2$ a full picture will be exposed through the sight opening of the projector, the stoppage of the projector is prevented except at a time when a full picture is so exposed. The actuation of the clutch mechanism, of the manually operative switch $n$ and the automatically actuated switch $h$ is as described in connection with the form of the invention shown in Fig. 1 of the drawings and the insulated portion $o^4$ of the commutator will have substantially the same effect as the heel $m^2$ and the end of the core $f'$ in preventing the actuation of the magnet $f$ at all times except when a full picture is exposed through the sight opening of the projector.

By having the contacts $o'$ of sufficient length, positive actuation of the clutch connecting the pulley $b$ with the shaft $a$ may be secured so that overrunning of the film is prevented. The form of the invention shown in Fig. 2 does not, however, secure the positive locking which is afforded by the projection of the end of the core $f'$ over the heel $m^2$ in the form of the invention shown in Fig. 1.

It is apparent from the foregoing that by means of a controlling mechanism made in accordance with my invention, the actuation of the means for stopping the projector may be so synchronized with the film movement as to insure the stoppage of the film only under conditions when a full picture will be exposed at the sight opening. It will also be observed that the means for securing this result are operative entirely independently of the means actuated as a result of the discharge of the firearm for stopping the projector, so that a full picture will be exposed upon the screen in the stationary position irrespective of the moment of the actuation of the automatically acting means since the operative effect of this means is modified by the first named mechanism. It will also be observed that the interposition of the means controlling the moment of the operative effect of the automatically actuated means for stopping the projector will insure the stoppage of the machine no later than the exposure of the next picture following the actuation of said automatically actuating means.

By means of my invention, I thus secure the two-fold effect of a positive stoppage of the projector with a full picture exposed through the sight opening and greater accuracy in marking by reason of the fact that the overrunning of the projector after the actuation of the automatically actuated means is prevented.

It is not my intention to limit the invention to the precise details of construction shown in the accompanying drawings, it being apparent that such may be varied without departing from the spirit and scope of the invention.

Having described the invention, what I claim as new and desire to have protected by Letters Patent is:—

1. A cinematograph target embodying therein a controlling mechanism for a projector including therein a switch adapted to be automatically actuated to control an electric circuit substantially simultaneously with the discharge of a firearm, means whereby the transmission of power to the film feeding mechanism of the projector is controlled, means included in said circuit adapted to actuate said first named means and automatically acting means whereby the actuation of said switch mechanism is made inoperative as to said first named means except when a full picture is exposed to the sight opening of the projector.

2. A cinematograph target embodying therein a controlling mechanism for a projector including therein a switch adapted to be automatically actuated to control an electric circuit substantially simultaneously with the discharge of a firearm, means whereby the transmission of power to the film feeding mechanism of the projector is controlled, means included in said circuit adapted to actuate said first named means, automatically acting means whereby the actuation of said switch mechanism is made inoperative as to said first named means except when a full picture is exposed to the sight opening of the projector, and manually operative means whereby said circuit may be controlled independently of said automatically actuated switch.

3. A cinematograph target embodying therein a controlling mechanism for a projector including therein a switch adapted to be automatically actuated to control an electric circuit substantially simultaneously with the discharge of a firearm, a clutch mechanism through which power is applied to the film feeding mechanism of the projector, an electro-magnet included in said circuit operative connections between said clutch mechanism and said magnet, and automatically acting means whereby the actuation of said magnet is prevented except when a full picture is exposed to the sight opening in the projector.

4. A cinematograph target embodying therein a controlling mechanism for a projector, including therein a switch adapted to be automatically actuated to control an electric circuit substantially simultaneously with the discharge of a firearm, a clutch mechanism through which power is applied to the film feeding mechanism of the projector, an electro-magnet included in said circuit operative connections between said clutch mechanism and said magnet, automatically acting means whereby the actuation of said magnet is prevented except when a full picture is exposed to the sight opening in the projector and manually operative means whereby said circuit may be controlled independently of said automatically actuated switch.

5. A cinematograph target embodying therein a controlling mechanism for a projector including therein a switch adapted to be automatically actuated to control an electric circuit substantially simultaneously with the discharge of a firearm, means whereby the transmission of power to the film feeding mechanism of the projector is controlled, means included in said circuit adapted to actuate said first named means; a rotary member turned in synchronism with said film feeding mechanism, having alternate surfaces adapted respectively to prevent the actuation of said switch mechanism from operatively affecting said first-named means and to permit said switch mechanism to operatively affect said means and means coöperating with said rotary member whereby the actuation of said switch is made inoperative as to said first-named means except when a full picture is exposed to the sight opening of said projector.

6. A cinematograph target embodying therein a controlling mechanism for a projector including therein a switch adapted to be automatically actuated to control an electric circuit substantially simultaneously with the discharge of a firearm, means whereby the transmission of power to the film feeding mechanism of the projector is controlled, means included in said circuit adapted to actuate said first named means, a rotary member turned in synchronism with said film feeding mechanism, having alternate surfaces adapted respectively to prevent the actuation of said switch mechanism from operatively affecting said first named means and to permit said switch mechanism to operatively affect said means, means coöperating with said rotary member whereby the actuation of said switch is made inoperative as to said first named means except when a full picture is exposed to the sight opening of said projector, and manually operative means whereby said circuit may be controlled independently of said automatically actuated switch.

7. A cinematograph target embodying therein a controlling mechanism for a projector including therein a switch adapted to be automatically actuated to control an electric circuit substantially simultaneously with the discharge of a firearm, an electro-magnet included in said circuit, a clutch mechanism through which power is transmitted to the film feeding mechanism of the projector, means normally setting said clutch mechanism, operative connections between said magnet and said clutch mechanism, a rotatable disk driven in synchronism with the film feeding mechanism, said disk having spaced depressions on the periphery thereof and risers between said depressions, an oscillatory lever mounted adjacent said magnet and actuated by said disk and means carried by said lever whereby the actuation of the connection between said magnet and said clutch is prevented except at an interval determined by the relative position of said lever and said disk as defined by said alternate depressions and risers.

8. A cinematograph target embodying therein a controlling mechanism for a projector including therein a switch adapted to be automatically actuated to control an electric circuit substantially simultaneously with the discharge of a firearm, an electro-magnet included in said circuit, a clutch mechanism through which power is transmitted to the film feeding mechanism of the projector, means normally setting said clutch mechanism, operative connections between said magnet and said clutch mechanism, a rotatable disk driven in synchronism with the film feeding mechanism, said disk having spaced depressions on the periphery thereof, and risers between said depressions, an oscillatory lever mounted adjacent said magnet and actuated by said disk, means carried by said lever whereby the actuation of the connection between said magnet and said clutch is prevented except at an interval determined by the relative position of said lever and said disk as defined by said alternate depressions and risers, and manually operative means whereby said circuit may be controlled independently of said automatically actuated switch.

9. A cinematograph target embodying therein a controlling mechanism for a projector including therein a switch adapted to be automatically actuated to control an electric circuit substantially simultaneously with the discharge of a firearm, a solenoid included in said circuit, a clutch mechanism through which power is transmitted to the film feeding mechanism of the projector, means normally setting said clutch mechanism, operative connections between the core of said solenoid and said clutch mechanism, a rotatable disk driven in synchronism with the film feeding mechanism, said disk having spaced depressions on the periphery thereof and risers between said depressions, and an oscillatory lever having a heel or arm adapted to be brought in substantial alinement with and in close juxtaposition to one end of the core of said solenoid and having a head adapted to enter said recesses whereby when said lever engages said risers the heel or arm carried thereby will prevent movement of the core of the solenoid and when the head of said lever enters one of said depressions, said core will be permitted to pass above said heel or arm and simultaneously release said clutch mechanism and arrest movement of said disk, the depressions in said disk being so spaced as to be in the operative relation to said lever only when a full picture is exposed through the sight opening of the projector.

10. A cinematograph target embodying therein a controlling mechanism for a projector including therein a switch adapted to be automatically actuated to control an electric circuit, substantially simultaneously with the discharge of a firearm, a solenoid included in said circuit, a clutch mechanism through which power is transmitted to the film feeding mechanism of the projector, means normally setting said clutch mechanism, operative connections between the core of said solenoid and said clutch mechanism, a rotatable disk driven in synchronism with the film feeding mechanism, said disk having spaced depressions on the periphery thereof, and risers between said depressions, an oscillatory lever having a heel or arm adapted to be brought in substantial alinement with and in close juxtaposition to one end of the core of said solenoid and having a head adapted to enter said recesses whereby when said lever engages said risers the heel or arm carried thereby will prevent movement of the core of the solenoid and when the head of said lever enters one of said depressions, said core will be permitted to pass above said heel or arm and simultaneously release said clutch mechanism and arrest movement of said disk, the depressions in said disk being so spaced as to be in the operative relation to said lever only when a full picture is exposed through the sight opening of the projector, and manually operative means whereby said circuit may be controlled independently of said automatically actuated switch.

In witness whereof I hereunto affix my signature in the presence of two subscribing witnesses, this 29th day of June, 1916.

HUBERT F. FRANKLIN.

Witnesses:
F. W. WEEKS,
F. T. WENTWORTH.